Figure 1:
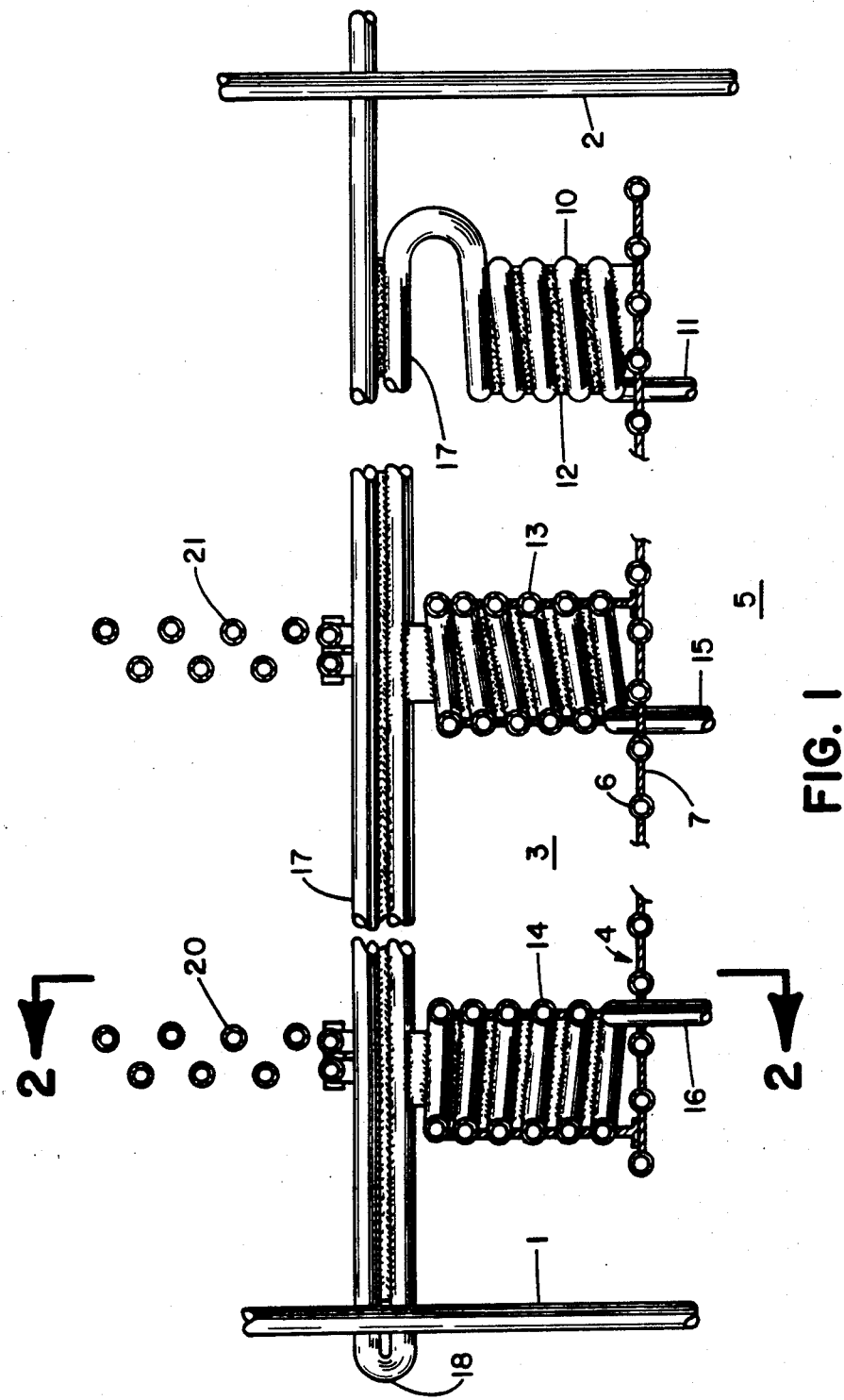

United States Patent [19]

Waryasz

[11] Patent Number: 4,466,385

[45] Date of Patent: Aug. 21, 1984

[54] SUPPORT FOR IN-BED HEAT EXCHANGER

[75] Inventor: Richard E. Waryasz, Longmeadow, Mass.

[73] Assignee: Combustion Engineering, Inc., Windsor, Conn.

[21] Appl. No.: 538,455

[22] Filed: Oct. 3, 1983

[51] Int. Cl.³ .............................................. F22B 37/24
[52] U.S. Cl. ................................. 122/510; 122/4 D; 165/104.16
[58] Field of Search .............. 122/4 D, 510; 110/245, 110/263; 165/104.16, 67, 68

[56] References Cited

U.S. PATENT DOCUMENTS

| | | | |
|---|---|---|---|
| 2,664,346 | 12/1953 | Maynew | 122/4 D |
| 4,173,950 | 11/1979 | Waryasz | 122/4 D |
| 4,253,425 | 3/1981 | Gambel et al. | 122/4 D |
| 4,300,458 | 11/1981 | Comparato et al. | 110/263 |
| 4,312,302 | 1/1982 | Kollerup | 122/4 D |

Primary Examiner—Edward G. Favors
Attorney, Agent, or Firm—Arthur L. Wade

[57] ABSTRACT

A heat exchanger is mounted in the upper portion of a fluidized combusting bed for controlling the temperature of the bed. The supported heat exchanger may be fed by or be a part of water-cooled tubes formed into support pillars extending up from the water-cooled plate by which the combusting bed is supported.

4 Claims, 2 Drawing Figures

SUPPORT FOR IN-BED HEAT EXCHANGER

TECHNICAL FIELD

The present invention relates to the support of cooling structure for a fluidized bed, which cooling limits the temperature of the bed and its formation of sulfur and nitrogen compounds. More particularly, the invention relates to structure extending from the plate beneath the fluidized bed in support of cooling coils within the bed, the support structure being cooled by liquid subsequently utilized to generate vapor.

BACKGROUND ART

As the energy crisis continues, the use of coal gains in importance as an energy source. There is general agreement throughout the industry that tremendous coal reserves are available, leaving the more prominent problems of transportation and handling to be solved.

The equipment in which coal is burned has been steadily improved from the ancient locomotive where shovelfuls of the solid fuel were manually pitched onto a grate where the heat of combustion rose to the bottom of a water boiler. The particle size of coal is now controlled by sophisticated mills and is air-transported through conduits and discharged from nozzles into combustion zones. At present, development has concentrated on burning crushed coal in a bed supported by a horizontally extended perforated structure up through which combustion air is forced. The problems of introducing the crushed solid fuel into the bed fluidized above the perforated support are paralleled by the innovations in the system for removing solid residue from the combustion zone.

Beyond the problems of fuel flow into the bed, and ash removal from the bed, is the problem of inhibiting discharge of sulfur and nitrogen compounds with the gaseous products of combustion. There are many different approaches to the control of these substances which threaten the environment, and controlling the maximum temperature of the combusting fluidized bed is a significant factor. In general, the present problems revolve around maintaining a heat exchanger in contact with the upper portion of the bed to maintain control of its temperature.

Establishing the reaches of a tubular heat exchanger within the upper portion of the bed for temperature control, may appear to be a simple problem. The banks of heat exchanger tubes reaches are to be supported in their longitudinal extension within the bed. The banks of tubes may be horizontally spaced from each other at distances which will not interfere with fluidizing the combusting bed. The present problem is how to support these banks of horizontal reaches by a structure which extends up from the bed support plate. This support for the heat exchanger is exposed to the high temperature of the bed and, therefore, this temperature must be controlled to prevent thermal distortion and deterioration of the support. Further, the support structure must be arranged to provide plenary access for inspection and maintenance personnel to the volume above the support plate and below the supported heat exchanger. As the space between the heat exchanger and the support plate is opened up, the minimum number of drain ports will be needed for unburned residue.

DISCLOSURE OF THE INVENTION

The present invention contemplates a heat exchange structure mounted within a fluidized bed upon supports formed of cylindrical pillars having walls of water-tube construction.

The invention further contemplates integrating the tubes of the pillar walls with the heat exchange structure supported by the pillars.

The invention further contemplates the heat exchange structure supported by the pillars being formed of water-cooled tubes grouped in the form of horizontal support beams.

The invention further contemplates a maximum personnel working space provided beneath the supported heat exchange structure and wherein the exchange between fuel fed to the bed and ash drained from the bed requires the minimum number of drains for the burned fuel residue.

Other objects, advantages and features of this invention will become apparent to one skilled in the art upon consideration of the written specification, appended claims, and attached drawings.

BRIEF DESIGNATION OF THE DRAWINGS

Figure 2:
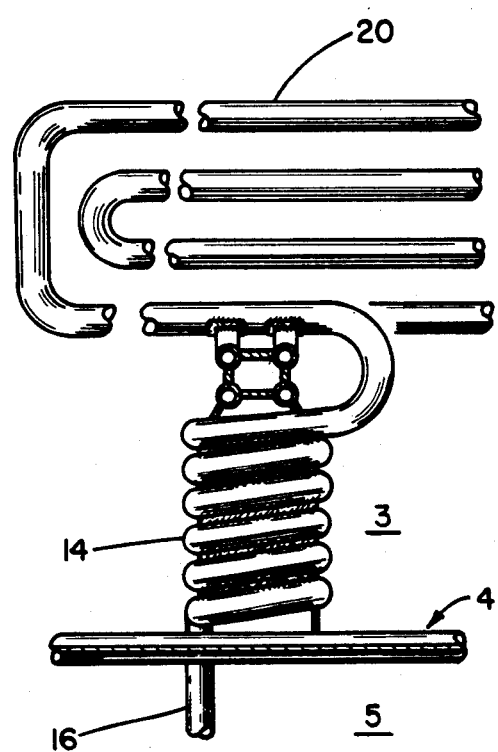

FIG. 1 is a partially sectioned elevation of a fluidized bed having heat exchange structure supported within the fluidized bed by pillars in which the present invention is embodied; and FIG. 2 is a section of the structure of FIG. 1 in the direction of 2—2.

BEST MODE FOR CARRYING OUT THE INVENTION

General Organization

After several abortive attempts to support heat exchangers in fluidized beds by solid, nonfluid-cooled structures, water-cooled designs for these support structures appeared as represented in Lawson U.S. Pat. No. 4,331,106, issued May 25, 1982. Although the water-cooled support structure of the Lawson disclosure was not warped or deteriorated by bed heat, it took up an unacceptable portion of the space between the perforated distributor plate and the supported exchanger. A plurality of access doors were required in the retaining walls of the fluidized bed to enable inspection and maintenance personnel to effectively perform work in this space.

In large measure, this structural limitation was responsible for the conception of the present invention. The simple, horizontal perforated plate supporting the bed between the vertical retaining walls is now formed of water tubes connected by a membrane through which the fuel and air nozzles are extended up from the plenum below. The water supplied the tubes of the exchanger support structure also extends up through the webbing of this water-tube plate. The stage is set for the disclosure of the invention in the volume between the upper surface of the water-cooled perforated plate and the supported heat exchange structure. The disclosure need not concern itself with the structure by which the bed-supporting plate is, in turn, supported. Further, all dimensions of tubes, exchangers formed by the tubes, and support structure are relative and no attempt will be made to give subjective dimensions which would detract from the disclosure of the invention.

The disclosure of the invention truly begins with the so-called "pillars" given the form of cylindrical columns vertically extending from the upper surface of the perforated plate. As the tubes of these columns or pillars extend beyond the top of the pillars, they will become integrated into horizontal beams supported by the tops of the pillars and contemplated heat exchangers supported by the beams. Both of these contemplated integrations will be disclosed.

The Fluidized Bed

The vertical retaining walls 1 and 2 represent all the walls required to retain the combusting fluidized bed 3 above the support plate 4. At least the numeral 3 is placed to positively orient the fluidized bed as above support plate 4 and within walls 1 and 2. Below plate 4, a plenum 5 is indicated as a location for the source of fluids and fuel conducted up through the plate.

The support or distributor plate 4 has its structure indicated as comprised of tubes 6 linked by a membrane 7. In effect, the tube-membrane combination is quite similar to the familiar water walls of utility furnaces. It is necessary that the structure embodying the present invention carried above the upper surface of plate 4 be sized, spaced, and arranged to offer minimum interference to fluidizing the solid fuel being burned at a multiple-foot depth. Neither the feed system for the fuel and combustion air, nor the arrangement for ash removal, are disclosed, as that would not contribute to the disclosure of the present invention. However, it is to be understood that the elimination of bed-compartmenting support structures enables the minimum bed drains to be provided. Further, any structural support members needed below plate 4 are not shown because they are unnecessary to the disclosure.

At this stage of disclosure, it is emphasized that the space between plate 4 and the supported heat exchanger will be accessible through a door in any of the vertical retaining walls represented by walls 1 and 2. In this embodiment of the invention it is contemplated that only a single door need be strategically placed to gain plenary access to this space by personnel. One of the principal objectives of the invention is to provide support structure which will not encumber the inspection, maintenance or replacement periodically necessary during shutdown of the combustor operation.

Support Pillars

The invention is primarily embodied in a plurality of pillars or columns extending up from their mounting on the surface of plate 4. The primary function of these pillars is support of heat exchange structures on their upper ends a predetermined distance above the upper surface of plate 4. Next, each pillar is formed to function as a heat exchanger. Finally, the heat exchange fluid exiting the pillars is placed in circuit with the heat exchangers supported by the pillars.

Referring more specifically to FIG. 1, three pillars are disclosed to represent the plurality desired for the structural support of heat exchangers on their upper ends. Pillar 10, on the right, is formed by coiling tube 11 into a spiral and connecting each spiral by a membrane or webb 12. Tube 11 is extended through plate 4, being welded thereto and receiving water from a source in plenum 5 below the plate. The tube-membrane combination forms a cylindrical, hollow pillar extend-vertically from the upper surface of plate 4.

Pillar/columns 13 and 14 are shown in section, grounded on the upper surface of plate 4. All these pillars, posts, columns, or whatever they may be termed, are load-bearing structures supporting in-bed heat exchangers at predetermined distances above plate 4. Upon close examination, these structures are seen to be hollow cylinders in form. Within the bed, ash will fall into the open tops of these cylinders and remain lodged there permanently. Nevertheless, even as ash receptacles, they will continue to function as support structures and heat exchangers. Tube 14 of pillar 13 and tube 16 of pillar 14 conduct water upward as a heat exchange fluid, while each pillar functions to bear the weight of heat exchange structure.

Pillar Tubes As Heat Exchange Beams

Each tube of the pillars is integrated into the fluid circuit of the heat exchangers supported by the pillars. Roughly, under the concepts of the present invention, a choice bebween two circuits is provided for the fluid exiting the pillars. In representation of the first circuit provided for the pillar tubes, tube 11 of pillar 10 is disclosed as extended or integrated into tube 17. Tube 17 is arrnged as a load-bearing beam horizontally extended over the upper ends of the pillars disclosed. For simplicity in illustration, tube/beam 17 is disclosed as arranged in two reaches looping back from a hairpin turn 18 as extended through vertical retaining wall 2 to link up with downstream heat exchange tubes as may be called for by design. Tube/beam 17, arranged horizontally, only represents any number of reaches into which the tube may be formed to provide a beam for the support of an additional heat exchanger on its upper surface. The bottom line is that tube/beam 17 receives the fluid flowing up through tube 11 and provides additional heat exchange with the fluidized bed 3 while simultaneously functioning as a load-bearing structure.

Heat Exchange Structure Supported By Beam 17

A heat exchange structure is represented at 20, supported on the upper surface of beam 17. This heat exchanger 20 provides a second circuit for the fluids of the pillar tubes. In specific illustration of this integration, tube 16 of pillar 14 is connected to heat exchanger 20 to flow the heated water from tube 16 into the tube forming heat exchanger 20. FIG. 2 is to be taken together with FIG. 1 to show how tube 16 is lead up and around horizontal beam 17 to form its union with heat exchanger 20. The exit of heat exchanger 20 is to be inferred as conducting water into additional heat exchangers or water walls in the fluidized bed combustor system. The teaching of the present invention is that the fluids of the pillars are provided heat exchanger 20 as an alternate circuit to that provided by beam 17.

Having wedded pillar 10 to tube/beam exchanger 17, and pillar 14 to exchanger 20, pillar 13 is somewhat redundant in that it is wedded to heat exchanger 21. Both pillars 13 and 14 have been sectioned to dramatize how their tubes are spiraled upward to form the walls of the pillars when joined by welding, webbing, or membrane. Tube 15 of pillar 13 is lead up and around beam 17 to make union with the tube forming heat exchanger 21. The reaches of both heat exchangers 20 and 21 are seen from their ends in FIG. 1 as they extend transverse a series of parallel horizontal beams similar to beam 17. Thus, pillar 13 and heat exchanger 21 are a duplicate of pillar 14 and heat exchanger 20 for the purposes of disclosing the present invention.

Conclusion

Keep clearly in mind that the objectives of the present invention provide plenary working space beneath the supported heat exchange structure within a fluidized bed, the connection between water as a heat exchange fluid below the bed support plate and the supported heat exchange structure is provided by the pillars disclosed. The tubes making the connection between the source of water and the supported heat exchange structure is formed into a spiral and welded to form a compact, sturdy, load-supporting column mounted upon the upper surface of the bed plate. With this single stroke, an arrangement of a gallery of these columns provide open space between bed support plate and supported heat exchangers to which a single personnel access point can be made through the vertical retaining wall of the combustor. Further, the heat exchange tubes forming the pillars or columns are provided either the circuit of any necessary horizontal beams across the top of the pillars, or heat exchangers supported by the beams. The embodiment encompasses three sections of heat exchangers. Initially, the pillars are formed with the first tubes which are, themselves, heat exchangers. Next, the beams formed with the second tubes, supported on the tops of the pillars, are heat exchangers. Finally, the heat exchangers formed with the third tubes and supported on top of the beam provide a circuit alternate to the beam for heat exchange fluid flowing from the pillar tubes. All this support and heat exchange structure is arranged with heretofore unavailable freedom for personnel making a periodic inspection, replacement and repairs of the combustor. Not the least of the benefits gained by opening up the space beneath the heat exchangers, is the provision for a minimum number of bed drain ports required for ash removal.

In reducing the invention to practice, the number and spacing of pillars required to support the in-bed exchangers is a matter of design. The number of reaches formed with the second tube extending as a beam will depend upon the load sustained by the beam. Finally, the number of heat exchangers formed by the third tube will depend upon the cooling requirements of the bed in which the exchangers are supported. The invention is embodied in the configuration of the load-bearing pillars which provide adequate support to the in-bed heat exchangers, while simultaneously providing plenary access to the space below the heat exchangers and above the bed support plate. The invention is broadly defined by the configuration of a single pillar and supported heat exchange structure. Extending the concept, invention is found in the provision of supported heat exchangers fed by the water flowing from the heat exchange tubes of the pillars. The invention provides one or more pillars whose heat exchange tubes supply heat exchange beams, or heat exchangers supported by the beams.

From the foregoing, it will be seen that this invention is one well adapted to attain all of the ends and objects hereinabove set forth, together with other advantages which are obvious and inherent to the apparatus.

It will be understood that certain features and subcombinations are of utility and may be employed without reference to other features and subcombinations. This is contemplated by and is within the scope of the invention.

As many possible embodiments may be made of the invention without departing from the scope thereof, it is to be understood that all matter herein set forth or shown in the accompanying drawings is to be interpreted in an illustrative and not in a limiting sense.

I claim:

1. A support structure for an in-bed heat exchanger of a combusting fluidized bed, including, a horizontal support plate for the fluidized bed, vertical bed-retaining walls at the edges of the horizontal plate, a first heat exchange tube extending upward through the horizontal plate spiraled to form a load-bearing pillar extending from the upper surface of the horizontal plate, a supply of cooling fluid mounted below the support plate and connected to supply the first heat exchange tube, a second heat exchange tube formed into a heat exchanger within the fluidized bed and mounted on the top of the pillar formed by the first heat exchange tube, and a connection between the first and second heat exchange tubes to form a circuit for the fluid flowing from the supply up through both heat exchangers.

2. The support structure of claim 1, in which, the second heat exchange tube is formed into a beam with horizontal reaches of the tube extending through parallel retaining walls.

3. The support structure of claim 2, including, a second load-bearing pillar supporting the beam, a third heat exchange tube formed into a heat exchanger supported by the beam, and a connection between the tube of the second pillar and the third heat exchange tube to form a circuit for fluid flowing through the tube of the second pillar and the third heat exchange tube.

4. The support structure of claim 3, wherein, each of the pillars is formed by a coiled tube whose spiraled turns are connected by membranes to form the pillar as a hollow open-top cylinder whose bottom rests on the horizontal plate and whose top mounts the beam and third tube heat exchanger a predetermined distance above the horizontal plate and within the fluidized bed.

* * * * *